Patented Oct. 23, 1945

2,387,318

UNITED STATES PATENT OFFICE 2,387,318

POLYMERIZATION CATALYST

Harry E. Drennan, Bartlesville, Okla., assignor to Phillips Petroleum Company, a corporation of Delaware No Drawing. Application June 7, 1941, Serial No. 397,133

7 Claims. (Cl. 252—217.3)

The present invention relates to catalytic agents which are particularly useful for the conversion of olefins to hydrocarbons of higher molecular weight and methods of preparation thereof. This application is a continuation-in-part of my prior copending application Serial No. 196,048, filed March 15, 1938, which has issued as Patent No. 2,282,602.

Conversion of olefins to higher-boiling hydrocarbons has been accomplished by employing certain conditions of temperature and pressure, either with or without certain catalysts. Several substances have been found to be active catalysts in promoting the conversion of olefins to higher-boiling products. Advantages accruing from the use of such catalysts have been found to be lower operating temperatures and pressures, higher flow rates, higher yields or the production of more desired products with less undesired products.

Catalysts of the present invention are to be distinguished from the phosphorus pentoxide or phosphoric acid variety, in which the prepared product contains acid phosphates. Catalysts prepared according to this invention are substantially free of acid phosphates, and apparently for that reason are of enhanced activity. Precautions are taken during preparation of the catalysts to exclude moisture and the reactants include an ingredient which forms a carbonaceous residue on heating, thereby imparting moisture repellent properties to the catalyst. Under these conditions, substantial formation of acid phosphates is prevented.

According to the present invention, catalytic material composed of phosphorus pentoxide ($P_2O_5$) together with a metal oxide suitably treated to form an active catalyst, as is hereinafter set forth, is employed to promote the conversion of olefins to higher-boiling hydrocarbons, under relatively mild conditions and in good yield. This catalytic material is very effective in the conversion of normally gaseous olefins to normally liquid hydrocarbons, such as, but not confined to, those boiling within the gasoline range. Furthermore, when olefins are contacted with this phosphorus pentoxide-metal oxide catalyst under certain conditions set forth hereinafter, a motor fuel of high anti-knock characteristics may be produced. Motor fuels with a high octane number and high lead susceptibility, which can be leaded within the permissible concentration to provide fuels having an octane number of 100, can be produced readily from normally gaseous olefins by the practice of the present invention. This feature of the present invention is of great importance because of the growing demand for 100-octane-number fuel for aviation purposes. Hydrogenation of the resulting fuel by any of the conventional processes will produce a fuel which meets certain of the army aviation fuel specifications for 100-octane-number fuel.

According to the present invention, phosphorus pentoxide ($P_2O_5$) may be combined with a metal oxide, preferably with the addition of a binder and with or without a porous support or carrier such as petroleum coke, to provide a very efficient catalyst which is substantially non-hydroscopic, is in the form of porous granules, and which exhibits high catalytic activity in the conversion of olefins to higher-boiling products under certain conditions of temperature and pressure, as will be set forth hereinafter. The catalyst prepared in accordance with this invention displays not merely additive functions of the combined ingredients, but constitutes a new and highly effective catalytic material. It is much more effective than phosphorus pentoxide itself. The metal oxides alone show very little or no catalytic activity in the polymerization of olefins and hence act as catalysts only when combined with phosphorus pentoxide in the manner described in the present specification. In addition to enhancing the effect of the phosphorus pentoxide, the metal oxide appears to maintain the phosphorus pentoxide in an active condition by re-oxidation, as referred to hereinafter.

In the preparation of catalysts of this invention, phosphorus pentoxide and a metal oxide, or a mixture of metal oxides, are intermixed, preferably in a powdered state. A suitable binder, also in powdered state, is incorporated in the mixture which is then heated to a temperature within the range of 600° to 800° F. (316° to 427° C.) in dry air. Care must be taken that any air present be dry, because of the high hygroscopic activity of phosphorus pentoxide. As the mixture approaches the above temperature range, evolution of heat takes place, thus indicating that some change of a chemical nature is occurring, possibly a reaction between the metal oxide and phosphorus pentoxide with the production of a complex reaction product. Since I am not aware of the exact nature of this change, however, I do not wish to be limited by any theory herein advanced, but merely wish to state that some change does take place, either physical, chemical or both, which produces an active catalytic material from the relatively inactive materials which are used in its preparation. I choose to refer to this treatment as a calcining operation, and wherever that term is used herein it is intended to mean the heat treatment of the mixture of phosphorus pentoxide and metal oxide to produce an active catalyst in suitable form. When a supported catalyst is desired, the support, for example, petroleum coke, in granular or particulate form, is mixed with the phosphorus pentoxide, metal oxide and binder before the heating procedure, as more fully described hereinafter.

Phosphorus pentoxide ($P_2O_5$) should comprise a major portion of the catalyst mixture, with a minor portion of metal oxide and a small amount of binder. In general, the metal oxides which are suitable as constituents of the catalyst are the oxides of copper, chromium, magnesium, manganese, iron, zinc, aluminum, tin, bismuth, cobalt and nickel. It should be understood that these oxides are not of equal effectiveness when combined with phosphorus pentoxide to form a conversion catalyst. Copper and magnesium oxides are the most effective, with cuprous oxide exhibiting slightly more activity than cupric oxide. Iron oxide is next in effectiveness, although it is less effective in the combined catalyst than copper and magnesium oxides. The other oxides are of about equal effectiveness. Instead of using metal oxides I may use metals and salts thereof which are converted in the preparation of the catalyst to the desired corresponding metal oxides.

Mixtures of the specified metal oxides when combined with phosphorus pentoxide provide very effective catalysts. One of the most effective catalysts in accordance with this invention is one containing a binder and a major proportion of phosphorus pentoxide and a minor proportion of a mixture of cuprous oxide and brucite ($Mg(OH)_2$); the brucite is dehydrated to the oxide on heating within the range hereinabove specified.

Various substances which yield a carbonaceous residue when heated to 600° to 800° F. may be employed as binders. Tar, particularly petroleum tar, asphalt, heavy petroleum oils, glue, starch, and sugar constitute efficient binders. Hydrocarbons, in the form of tars or asphalts or heavy oils, coke upon heating within the aforementioned temperature range, thus providing a catalyst of superior physical properties in the form of a hard, porous solid, and for that reason are preferred.

A special procedure has been found to give best results in preparing catalysts employing materials which form coke, as binders. The metal oxide or mixture of metal oxides is ground and added to the ground phosphorus pentoxide, care being taken to prevent moisture from coming in contact with the phosphorus pentoxide during the mixing. The hydrocarbon to be used as a binder is dissolved in gasoline and added to the mixture of phosphorus pentoxide and metal oxide and thoroughly stirred, a thick paste resulting. This paste is poured into shallow trays and is heated in an oven and brought to a temperature of approximately 550° F. in about two hours. The catalyst is then removed, cooled and crushed to pass a 4-mesh screen after which it is returned to the oven and heated to about 700° F. After cooling it is crushed and screened to the desired size. According to the present invention, it has been found that heating to 600 or 700° F. without removal from the oven causes the catalyst to fluff, with the result that a large portion is soft and powdery. If it is cooled after heating to 550° F. and crushed, it will not fluff or soften upon subsequent heating to the desired temperature. The reason for this fluffing when the catalyst is heated suddenly to the desired temperature is not definitely known, although it is probably due to the rapid evolution of gases at above 550° F.

Catalysts prepared in the above manner will be found to be practically non-hygroscopic. They may be placed in water without loss or more than a small proportion of phosphorus pentoxide. The reason for this appears to be that the tar or other binder disintegrates to some extent under the influence of heat and forms a coating of carbonaceous or semi-carbonaceous matter, which acts to protect phosphorus pentoxide. This coating is of such porosity that the activity of the catalyst is substantially unimpaired and it also counteracts the hygroscopic nature of the phosphorus pentoxide without substantially affecting the activity of the metal oxide.

As hereinabove stated, phosphorus pentoxide comprises the major constituent of the catalysts of the present invention, associated with relatively smaller amounts of a metal oxide or a mixture of metal oxides. The proportion of metal oxides may be varied between 10 and 50 per cent, but the most efficient catalyst is obtained when the proportion of metal oxide or mixture of oxides is held within the range of 15 to 35 per cent of the total ingredients. A very efficient mixture consists of phosphorus pentoxide, 65% by weight; metal oxide, 25% by weight; and binder, 10% by weight. In preparing supported catalysts, the phosphorus pentoxide may constitute 40% or more of the catalyst mixture but ordinarily, is 30% or less by weight thereof. Metal oxide is employed in the proportion of 10% or more but not less than 0.5% and preferably about 1 or 2% of the mixture. The proportion of metal oxide seems to have an effect on the activity of the resultant catalyst and maintains the same in an active condition. The proportion of the binder may be varied from approximately 3 to 20% and appears to influence materially the water-resistant characteristics of the resultant catalyst in addition to exerting its normal effect as a binder.

The apparatus which may be employed in carrying out catalytic conversion processes with the catalysts of the present invention may be very simple and need constitute no more than a conventional heating unit and a tower containing the catalyst. If desired, the tower may be heated directly.

Olefins suitable for conversion in accordance with this invention may be obtained from a variety of sources. In general any gas mixture containing olefins in suitable quantities may be employed. Dehydrogenation of saturated hydrocarbon gases and gases resulted from cracking operations are very suitable as olefinic charging stocks.

In the use of the catalysts of the present invention, gases containing polymerizable olefins may be contacted with one of the above-described catalysts at a temperature generally within the range of 200–500° F. In most instances the preferred temperatures will fall within the range of 200 to 425° F. With phosphorus pentoxide-copper oxide catalysts, temperatures of between 325 to 425° F. appear to be productive of optimum results, while the phosphorus pentoxide-magnesium oxide catalyst appears to be of maximum effectiveness when the charging vapors are heated to within the range of 350 to 425° F. Specific temperatures which are most suitable for any one catalyst with specific pressures and charging stocks cannot, of course, be given. It will suffice to say that operation within the above disclosed temperature ranges will generally be satisfactory, the particular optimum temperature to be employed under any specific set of conditions being readily determinable by trial.

Pressures may be varied over a wide range with satisfactory results. In general, pressures from as low as 100 pounds per square inch to several thousand pounds per square inch are effective, the particular pressure best suited for any set of operating conditions and for specific catalysts and charging stock varying, but being readily determinable by trial. For the most part, lower pressures may be employed with more-active catalysts while higher pressures are necessary for maximum yields with less-active catalysts. Under usual conditions and with suitable charging stock, pressures of 700 pounds per square inch or lower will be found suitable. Very satisfactory results have been obtained with pressures in the neighborhood of 200 pounds per square inch.

In polymerizing mixed olefins, such as butylenes and propylene, best results are obtained below 425° F. and preferably between 375° and 400° F., for long life of catalyst. In the polymerization of ethylene, temperatures between 425° and 475° F. give best results. At higher temperatures and pressures less heavy polymers are formed. Higher pressures improve the anti-knock qualities of the polymer, especially if the polymer is subsequently hydrogenated. For example, in polymerizing olefins to make high-octane-number gasoline, best results are obtained with pressures between 700 and 5000 pounds gage. Polymers formed with the catalysts of the present invention at pressures from 1500 to 5000 pounds from mixed polymers of cracking still gases, after hydrogenation can be leaded to 100 octane number by the addition of 3 cc. of tetraethyl lead per gallon (by the A.S.T.M. or Army method).

High flow rates may be employed in the process herein described. In general, flow rates of 100 barrels of liquid charging stock per hour, per ton of catalyst, may be used. Specific flow rates will vary over wide ranges, however, optimum rates for specific conditions being readily determinable by trial.

Specific conditions of operation which will be productive of motor fuels with an octane number of 100 or thereabouts, which constitutes one of the particular merits of the processes of the present invention, are set forth hereinafter. In general, the effective temperature range for the production of motor fuels having an octane rating of approximately 100, from mixtures of olefins in the presence of the catalyst, will be 300 to 425° F. at pressures ranging from 200 pounds per square inch to 3000 pounds per square inch. As the temperature is raised a corresponding increase in pressure is necessary for the production of motor fuel with a high octane rating. Optimum results were obtained with temperatures of between 350 to 375° F. and at pressures from 700 to 1000 pounds per square inch. Under these conditions approximately 95% of the olefins in a refinery gas containing 25% olefins was converted into a motor fuel base stock which after hydrogenation and addition of 3 cc. of tetraethyl lead per gallon of stock had an octane number of 100.

The following tables set forth the characteristics of motor fuels of high octane number manufactured from vapor-recovery gasoline containing 22% olefins under different conditions of temperature and pressure. The catalyst was composed of phosphorus pentoxide, 65%; cuprous oxide, 12.5%; brucite, 12.5%; and tar, 10%, prepared as described, hereinabove. The flow rate in each instance was 100 barrels of liquid vapor recovery gases per hour per ton of catalyst.

Table I

| Operating pressure lb./sq. in. | 200 | 700 | 2,000 |
|---|---|---|---|
| Temperature °F. | 300 | 300 | 300 |
| Characteristics of resulting fuel: | | | |
| Gr. A. P. I. | 61.1 | 64.2 | 64.7 |
| I. B. P. | 100 | 98 | 92 |
| End point | 474 | 474 | 406 |
| Percent at 206° F. | 16 | 16 | 11 |
| Percent recovery | 90 | 90 | 86 |
| Percent loss | 9 | 9 | 13 |
| Octane number | | 88.8 | 89.1 |
| Octane number after hydrogenation+3 cc. TEL | 100.3 | 101.4 | 101.7 |
| Approximate yield percent | 38 | 60 | 64 |

Table II

| Operating pressure lb./sq. in. | 200 | 700 | 2,000 |
|---|---|---|---|
| Temperature °F. | 350 | 350 | 350 |
| Characteristics of resulting fuel: | | | |
| Gr. A. P. I. | 64.6 | 65.0 | 65.4 |
| I. B. P. | 88 | 86 | 86 |
| End point | 492 | 476 | 446 |
| Percent at 206° F. | 26 | 26 | 27 |
| Percent recovery | 85 | 86 | 87 |
| Percent loss | 14 | 12 | 12 |
| Octane number | | 84.3 | 85.5 |
| Octane number after hydrogenation+3 cc. TEL | 95.8 | 98.3 | 99.4 |
| Approximate yield percent | 68 | 90 | 98 |

Table III

| Operating pressure lb./sq. in. | 200 | 700 | 2,000 |
|---|---|---|---|
| Temperature °F. | 400 | 400 | 400 |
| Characteristics of resulting fuel: | | | |
| Gr. A. P. I. | 65.3 | 65.6 | 66.5 |
| I. B. P. | 86 | 88 | 90 |
| End point | 524 | 486 | 452 |
| Percent at 206° F. | 29 | 28 | 26 |
| Percent recovery | 85 | 83 | 84 |
| Percent loss | 14 | 16 | 15 |
| Octane number after hydrogenation | 79.6 | 80.3 | 82.8 |
| Octane number+3 cc. TEL | 94.2 | 94.2 | 97.6 |
| Approximate yield percent | 64 | 90 | 98 |

Table IV

| Operating pressure lb./sq. in. | 200 | 700 | 2,000 |
|---|---|---|---|
| Temperature °F. | 425 | 425 | 425 |
| Characteristics of resulting fuel: | | | |
| Gr. A. P. I. | 62.7 | 63.8 | 64.5 |
| I. B. P. | 88 | 96 | 96 |
| End point | 546 | 504 | 466 |
| Percent at 206° F. | 28 | 26 | 26 |
| Percent recovery | 88 | 86 | 87 |
| Percent loss | 11 | 13 | 12 |
| Octane number after hydrogenation | 74.3 | 76.7 | 79.1 |
| Octane number+3 cc. TEL | 89.0 | 91.2 | 93.5 |
| Approximate yield percent | 60 | 82 | 85 |

It should be noted that in each instance, increasing pressures resulted in products of lower end points which is contrary to the usual experience and appears to be a unique feature of the present invention.

The following examples will further illustrate the value of this invention, but the invention is not to be restricted thereby.

*Example I*

Refinery gases containing 27.7% olefins by weight constituted the charging stock. A pilot plant consisting of a catalyst tower filled with a catalyst prepared as hereinabove described from a mixture of phosphorus pentoxide ($P_2O_5$), 70%; magnesium oxide (MgO), 25%; and starch (as a binder), 5%. The charging stock was fed to the catalyst tower under a pressure of 3000 pounds per square inch and at a flow rate of 83 liquid barrels per hour per ton of catalyst. The catalyst tower was maintained at a temperature of 400° F. A conversion per pass of 70% by weight of the total olefins charged was obtained, the product boiling entirely within the gasoline range, below 408° F. This product had an octane number of 86. After hydrogenation, and after the addition of 3 cc. of tetraethyl lead per gallon, its octane number was 100+.

Example II

The charging stock specified in Example I was fed to a catalyst tower under a pressure of 700 pounds per square inch and at a flow rate of 97 liquid barrels per hour per ton of catalyst. The catalyst tower was maintained at 350° F. A conversion per pass of 85.7% by weight of the total olefins charged was obtained, 83% of the olefins charged being converted to a liquid boiling within the gasoline range; this liquid had an octane number of 83, which, after hydrogenation and the addition of 3 cc. of tetraethyl lead per gallon, was raised to 99.3. The catalyst used was prepared from a mixture of phosphorus pentoxide ($P_2O_5$), 65%; cuprous oxide, 12.5%; brucite, 12.5% and tar, 10%.

Example III

The charging stock used in the preceding examples was fed to the catalyst tower containing the same catalyst as was used in Example II at a pressure of 2000 pounds per square inch and a flow rate of 114 liquid barrels of charging stock per hour per ton of catalyst. The tower was maintained at a temperature of 350° F. A conversion of 94% of the olefins charged to liquid products was obtained, 92% of the olefins charged being converted to liquids boiling within the gasoline range. This liquid had an octane number of 83.5, which after hydrogenation was raised to 85.5. Addition of 3 cc. of tetraethyl lead per gallon further increased the octane number to 99.4.

The following results were obtained with laboratory apparatus under low pressures but serve to indicate the relative effectiveness of the various catalysts. Isobutylene constituted the charge stock which was contacted with the various catalysts at a temperature of 360° F. and a pressure of 25 pounds per square inch absolute.

| Catalyst | Percent conversion | |
|---|---|---|
| | Gross | Net |
| $P_2O_5$, 70%; $Cu_2O$, 25%; binder, 5% | 85 | 80 |
| $P_2O_5$, 70%; $MgO$, 25%; binder, 5% | 77 | 75 |
| $P_2O_5$, 65%; $Fe_2O_3$, 25%; tar, 10% | 72 | 67 |
| $P_2O_5$, 70%; $ZnO$, 25%; binder, 5% | 48 | 44 |
| $P_2O_5$, 70%; $Al_2O_3$, 25%; binder, 5% | 30 | 28 |
| $P_2O_5$, 70%; $SnO$, 25%; binder, 5% | 21 | 19 |
| $P_2O_5$, 70%; $NiO$, 25%; binder, 5% | 21 | 19 |

In the above table, gross is to be understood to mean total conversion of isobutylene to liquid products and net conversion to represent the conversion of isobutylene to liquid products boiling within the gasoline range.

The foregoing relates specifically to methods of treating hydrocarbons with the unsupported catalysts described in my application Serial No. 196,048 (Patent No. 2,282,602) of which this application is a continuation-in-part.

When phosphorus pentoxide is used as a polymerizing catalyst it loses its activity slowly. This loss of activity is apparently due to reduction to lower oxides of phosphorus which are not as active as phosphorus pentoxide. The metal oxide, in addition to enhancing the catalytic effect of the catalyst, appears to maintain the phosphorus pentoxide in an active condition by re-oxidation. This is evidenced by reduction of oxides such as nickel and copper in spent catalysts. These reduced materials are easily re-oxidized when heated in air, and may be then available for further oxidation of lower oxides of phosphorus to phosphorus pentoxide at relatively low temperatures. In regenerating the catalyst it is preferable to maintain the temperature at 375° F., since this is the temperature at which polymerization is effected.

I have further discovered that the foregoing catalysts may be improved and may be produced with materially smaller quantities of metal oxide in proportion to phosphorus pentoxide, if a porous carrier or support such as coke or similar carbonaceous material is employed in the catalyst composition. Coke has been found especially suitable as a carrier for the phosphorus pentoxide and metal oxide due to its low ash content, and petroleum coke produces a slightly more active catalyst than coke obtained from coal distillation. An essential characteristic desired in the selection of a carrier is that it be substantially inert to the action of phosphorus pentoxide. Both coal and petroleum coke are suitably inert to the action of phosphorus pentoxide, and in this respect are distinguished from materials such as alumina, pumice, etc., which react with phosphorus pentoxide and disintegrate rather rapidly. Charcoal or other carriers having comparable properties, however, may be employed in place of coke. Unsupported catalysts have a slight tendency to disintegrate or powder in use, thus presenting some difficulty in practical plant operation.

Examples of typical methods of preparing supported catalysts according to the process of the invention and the use of such catalysts in the conversion of hydrocarbons are described in the examples which follow hereinafter.

Example IV

Coke is crushed and screened to the desired particle size (4 to 16 mesh). A suitable nitrate of the metal desired for the metal oxide constituent such as nickel or copper nitrate, is dissolved in water and contacted with the sized coke in sufficient quantity so that, after heating to decompose the nitrate, the coke will contain about 1% of the metal oxide. The coke impregnated with metal oxide is allowed to cool and then combined with a mixture of powdered phosphorus pentoxide and tar and the whole is thoroughly mixed. In this example the quantities of the various constituents are so proportioned that the coke forms approximately 70%, the phosphorous pentoxide 24%, the metal oxide 1%, and the tar 5% of the composition. The mixture is then heated between 550 and 750° F. for 30 minutes or until the tar has been converted to coke. The time of heating depends somewhat on the kind of tar being used; it is generally desirable to use a tar melting between 160 and 180° F., which can be crushed to a powder without gumming. Since phosphorus pentoxide is very hygroscopic, it is best to do the mixing out of contact with moist air. After calcining, the catalyst is practically non-hygroscopic. The tar forms a carbonaceous or coke-like material as a result of the heat treatment and is thereby rendered extremely compatable and adherent to the coke carrier.

A more specific example of a method for producing a supported catalyst of the foregoing type is as follows:

Example V

A catalyst was made by impregnating 97 parts by weight of petroleum coke, which had been crushed and sized to produce particles of from 4 to 10 mesh, with 3 parts by weight of copper nitrate in solution. The impregnated coke was dried at about 200° F., then the temperature was raised to 650 or 750° F. for about 30 minutes to convert the copper nitrate to copper oxide (about 1% by weight of the coke after conversion). Thereafter 24 parts of powdered $P_2O_5$ and 5 parts by weight of powdered tar was added to 71 parts by weight of the impregnated petroleum coke and thoroughly mixed therewith out of contact with moist air. Alternatively, copper oxide powder may be mixed with the $P_2O_5$ and tar before mixing with the coke. The mixture was quickly heated to from 600 to 750° F. and stirred and maintained within this temperature range for about 30 minutes or until the tar had coked, although some batches may require an hour of heating. When a small sample which is removed and cooled is no longer soft or sticky to the touch, indicating that the tar has coked, the catalyst may be cooled and stored for use.

In using the catalysts of the present invention to polymerize gaseous olefins, only simple equipment is necessary such as a tube or tower in which the catalyst is placed. The gases may be pumped up to a given pressure and preheated to a suitable temperature prior to passage through the catalyst mass or the catalyst chamber may be heated externally if desired. A few test runs will usually determine the best conditions of operation. For example, if the temperatures and pressures employed are such that the products exist entirely in vapor phase, the flow of the gases through the catalyst may be upward through filled towers, while if liquids are condensed, the best results m .y be obtained when down flows are used so that liquid does not accumulate on the surface of the catalyst. Horizontal flow seems to give the best results and a longer life before regeneration. It is desirable to have the catalyst arranged in a series of beds from 1 to 3 feet thick, with about a one-foot space between beds. With this arrangement, the polymers, if liquid, will drop out quickly and permit better contact between the gases and solid catalyst, and at the same time, reduce the formation of heavy polymers. The polymers will flow along the bottom of the tower or may be removed at one or more points on the bottom side of the tower. The following examples further illustrate the utility of catalysts of this invention.

Example VI

A coke catalyst prepared in accordance with Example V above was arranged in a horizontal treating tower maintained at a temperature of 375° F. and a condensate or reflux liquid from the stabilizer of a recovery plant for cracking still gases (which contained 26% olefins including propylene), was passed through the catalyst under a pressure of 700 pounds per square inch. The reflux liquid had been washed with caustic to remove $H_2S$. The charge rate was about 10 volumes of reflux liquid per volume of catalyst per hour. The polymer make was about 2.0 volumes per hour per volume of catalyst, or about 80% of the olefins were converted to polymers. The properties of the resulting product are shown in the following table:

Properties of gasoline hydrocarbons

| | |
|---|---|
| Gravity A. P. I. | 65.4 |
| Initial boiling point | 80 |
| 10% over at | 184 |
| 50% over at | 244 |
| 90% over at | 390 |
| End boiling point | 450 |
| Distillation loss | 2 |
| Octane number A. S. T. M. | 83.1 |
| Color | Yellow |

Example VII

A similar catalyst produced in accordance with Example V was used in a vertical treating tube maintained at a temperature of 375° F. and a pressure of 2000 pounds per square inch. Reflux liquid from a stabilizer for a vapor-recovery plant (which contained 26% olefins including propylene) was passed through the catalyst at the rate of 10 volumes of reflux liquid per volume of catalyst per hour; under these conditions, about 85% of the olefins were converted to polymers. The properties of the resulting product are shown in the following table:

Properties of gasoline hydrocarbons

| | |
|---|---|
| Gravity A. P. I. | 66 |
| Initial boiling point | 82 |
| 10% over at | 198 |
| 50% over at | 254 |
| 90% over at | 390 |
| End boiling point | 440 |
| Distillation loss | 2 |
| Color | Yellow |
| Octane No. A. S. T. M. | 83 |

Inasmuch as the foregoing description comprises preferred embodiments of my invention, it is to be understood that the invention is not limited thereto and that variations and modifications may be made therein without departure from its scope or from the scope of the appended claims.

I claim:

1. A process for the preparation of a substantially non-hygroscopic and water-free catalyst which comprises calcining under moisture-free conditions through the calcination of a moisture-free mixture of phosphorus pentoxide, a metal oxide selected from the group consisting of the oxides of copper, magnesium, iron, zinc, aluminum, tin, and nickel, and a binder which produces a carbonaceous residue upon heating, said calcination being conducted at a temperature and for a period of time sufficient to effect substantial conversion of said binder to said carbonaceous residue.

2. A process for the preparation of a substantially non-hygroscopic and moisture-free catalyst which comprises heating under moisture-free conditions a mixture of a major proportion of phosphorus pentoxide and a minor proportion of a metal oxide selected from the group consisting of the oxides of copper, magnesium, iron, zinc, aluminum, tin, and nickel, together with a coke-forming hydrocarbon to a temperature and for a period of time sufficient to form a hard, porous catalytic material in which the phosphorus pentoxide and the metal oxide are intimately bound with coke.

3. A process for the preparation of a substantially non-hygroscopic and water-free catalyst which comprises heating a moisture-free mixture comprising a major proportion of phosphorus pentoxide and a minor proportion of a metal oxide selected from the group consisting of the oxides of copper, magnesium, iron, zinc, aluminum, tin, and nickel, together with a binder which leaves a carbonaceous residue upon heating, to a temperature within the range of about 600–800° F. an for a period of time sufficient to substantially convert said binder to said carbonaceous residue, said heating being carried out under substantially moisture-free conditions throughout said heating period.

4. A process according to claim 2 in which the moisture-free mixture comprises phosphorus pentoxide with about 15–37% by weight of the metal oxide and about 3–20% by weight of the coke-forming hydrocarbon.

5. A catalyst for the conversion of hydrocarbons prepared by the method of claim 2.

6. A process for the preparation of a substantially non-hygroscopic and moisture-free catalyst which comprises heating a moisture-free mixture comprising a major proportion of phosphorus pentoxide and a minor proportion of a metal oxide selected from the group consisting of the oxides of copper, magnesium, iron, zinc, aluminum, tin, and nickel, together with a hydrocarbon material capable of coking upon heating, to a temperature of approximately 550° F., cooling said mixture, and then gradually reheating the same to a temperature of approximately 700° F., said heating being conducted under substantially moisture-free conditions and for a period of time sufficient to effect substantial coking of said hydrocarbons to form a hard, porous catalytic material in which the phosphorus pentoxide and metal oxide are intimately bound with coke.

7. A catalyst prepared by the method of claim 6.

HARRY E. DRENNAN.

CERTIFICATE OF CORRECTION.

Patent No. 2,387,318.            October 23, 1945.

HARRY E. DRENNAN.

It is hereby certified that error appears in the printed specification of the above numbered patent requiring correction as follows: Page 1, second column, line 15, for "non-hydroscopic" read --non-hygroscopic--; page 2, second column, line 65, for "200-500° F." read --200 to 500° F.--; line 67, for "200 to 425° F." read --250 to 425° F.--; page 5, second column, line 73, claim 3, for "an for" read --and for--; and that the said Letters Patent should be read with this correction therein that the same may conform to the record of the case in the Patent Office.

Signed and sealed this 26th day of February, A. D. 1946.

(Seal)                      Leslie Frazer
                      First Assistant Commissioner of Patents.

under substantially moisture-free conditions throughout said heating period.

4. A process according to claim 2 in which the moisture-free mixture comprises phosphorus pentoxide with about 15-37% by weight of the metal oxide and about 3-20% by weight of the coke-forming hydrocarbon.

5. A catalyst for the conversion of hydrocarbons prepared by the method of claim 2.

6. A process for the preparation of a substantially non-hygroscopic and moisture-free catalyst which comprises heating a moisture-free mixture comprising a major proportion of phosphorus pentoxide and a minor proportion of a metal oxide selected from the group consisting of the oxides of copper, magnesium, iron, zinc, aluminum, tin, and nickel, together with a hydrocarbon material capable of coking upon heating, to a temperature of approximately 550° F., cooling said mixture, and then gradually reheating the same to a temperature of approximately 700° F., said heating being conducted under substantially moisture-free conditions and for a period of time sufficient to effect substantial coking of said hydrocarbons to form a hard, porous catalytic material in which the phosphorus pentoxide and metal oxide are intimately bound with coke.

7. A catalyst prepared by the method of claim 6.

HARRY E. DRENNAN.

CERTIFICATE OF CORRECTION.

Patent No. 2,387,318.   October 23, 1945.

HARRY E. DRENNAN.

It is hereby certified that error appears in the printed specification of the above numbered patent requiring correction as follows: Page 1, second column, line 15, for "non-hydroscopic" read --non-hygroscopic--; page 2, second column, line 65, for "200-500° F." read --200 to 500° F.--; line 67, for "200 to 425° F." read --250 to 425° F.--; page 5, second column, line 73, claim 3, for "an for" read --and for--; and that the said Letters Patent should be read with this correction therein that the same may conform to the record of the case in the Patent Office.

Signed and sealed this 26th day of February, A. D. 1946.

(Seal)    Leslie Frazer
First Assistant Commissioner of Patents.